United States Patent [19]

Carroll et al.

[11] Patent Number: 4,995,989
[45] Date of Patent: Feb. 26, 1991

[54] SEPARATING LIQUIDS

[75] Inventors: Noel Carroll, Sassafras; Charles M. Kalnins, Malvern, both of Australia

[73] Assignee: Conoco Specialty Products Inc., Houston, Tex.

[21] Appl. No.: 455,402

[22] PCT Filed: Feb. 20, 1989

[86] PCT No.: PCT/AU89/00069
§ 371 Date: Dec. 15, 1989
§ 102(e) Date: Dec. 15, 1989

[87] PCT Pub. No.: WO89/07490
PCT Pub. Date: Aug. 24, 1989

[30] Foreign Application Priority Data

Feb. 19, 1988 [AU] Australia .................................. 6870/88
Mar. 30, 1988 [AU] Australia .................................. 7509/88
May 17, 1988 [AU] Australia .................................. 8278/88
Sep. 19, 1988 [AU] Australia .................................. 0509/88
Oct. 14, 1988 [AU] Australia .................................. 0942/88

[51] Int. Cl.⁵ .......................................... B01D 21/26
[52] U.S. Cl. .................................. 210/788; 55/345; 209/211; 210/512.2

[58] Field of Search .................. 55/545; 209/144, 211; 210/512.1, 512.2, 787,788

[56] References Cited

U.S. PATENT DOCUMENTS

4,601,734 7/1986 Meier et al. ..................... 209/144 X
4,764,287 8/1988 Colman et al. ....................... 210/788

Primary Examiner—Charles Hart
Attorney, Agent, or Firm—John E. Holder

[57] ABSTRACT

Apparatus (100) for separating components of a liquid mixture such as oil from water. The apparatus comprises a cyclonic device (110) and a separating device (150). The cyclonic device has a tangential inlet (112) for inlet of the mixture, an elongate chamber (114) in which, in use, the admitted mixture is subjected to centrifugal action and an outlet (116) from the components of the mixture are in use together taken. The separating device (150) may be a conventional cyclone separator having a separating chamber (154), with an inlet (152) coupled to in use receive the components from the outlet of the cyclonic device (110) for admission to the separating chamber (154), and separate outlets (156, 158) from the separating chamber (154) for respective outlet therefrom of th separated liquid components.

18 Claims, 5 Drawing Sheets

SEPARATING LIQUIDS

This invention relates to separating liquids.

This invention is based on the observation that, if a liquid mixture such as an oil water-mixture is subjected to centrifugal action, the mixture is conditioned in a fashion which facilitates subsequent separation of components of the mixture.

The invention provides, in one aspect, a method of separating components of a liquid mixture comprising passing the mixture to a cyclonic device from which the components of the mixture are taken via one outlet and then together passed to a separating device from which the separated components are separately taken.

The invention also provides separating apparatus for separating components of a liquid mixture and comprising a cyclonic device and a separating device, the cyclonic device having an inlet for inlet of the mixture, a chamber in which, in use, the admitted mixture is subjected to centrifugal action and an outlet from which the components of the mixture are in use together taken; the separating device having a separating chamber, with an inlet coupled to in use receive the components from the outlet of the cyclonic device for admission to the separating chamber, and separate outlets from the separating chamber for respective outlet therefrom of the separated liquid components.

The separating device may be a conventional separator, such as a cyclonic device or a settling chamber. By the term "cyclonic device" is meant any device effective to subject the mixture to centrifugal action.

Suitable cyclonic devices comprise devices like cyclonic device as used for separating liquid components in a mixture thereof one from the other, but where no necessary provision is made for bringing out from the separator the separate components. For example suitable devices are described in Australian patent specifications 559,530, 521,482, 77610/87, 38866/85, 40909/85, 12241/83, and PCT/AU87/00402 where no provision is made for take off of liquid from the overflow outlet, liquid being taken from the underflow outlet of the cyclonic device for admission to the separating device. The disclosures of these specifications are hereby incorporated into the present specification to form part thereof.

The separating device may comprise a cyclonic device as described in these prior patent specifications.

The cyclonic device and also the cyclone separator may have one or more inlets arranged for inlet of the mixture with a tangential component of motion to the chamber thereof.

In yet another aspect, the invention comprises an axially extending cyclonic device having an elongate chamber having at least one inlet at one closed end thereof and an axial outlet at the other end, the or each inlet being arranged for inflow of a liquid mixture into the chamber with a tangential component of motion whereby to cause the mixture to be subjected to centrifugal action and thence to be directed to emerge from the chamber via said outlet, and wherein $$3 \leq \frac{\pi d_i^2}{8 A_i} \leq 30$$

where $d_i$ and $A_i$ are as hereinafter defined.

The invention is further described by way of example only with reference to the accompanying drawings in which.

Figure 1:
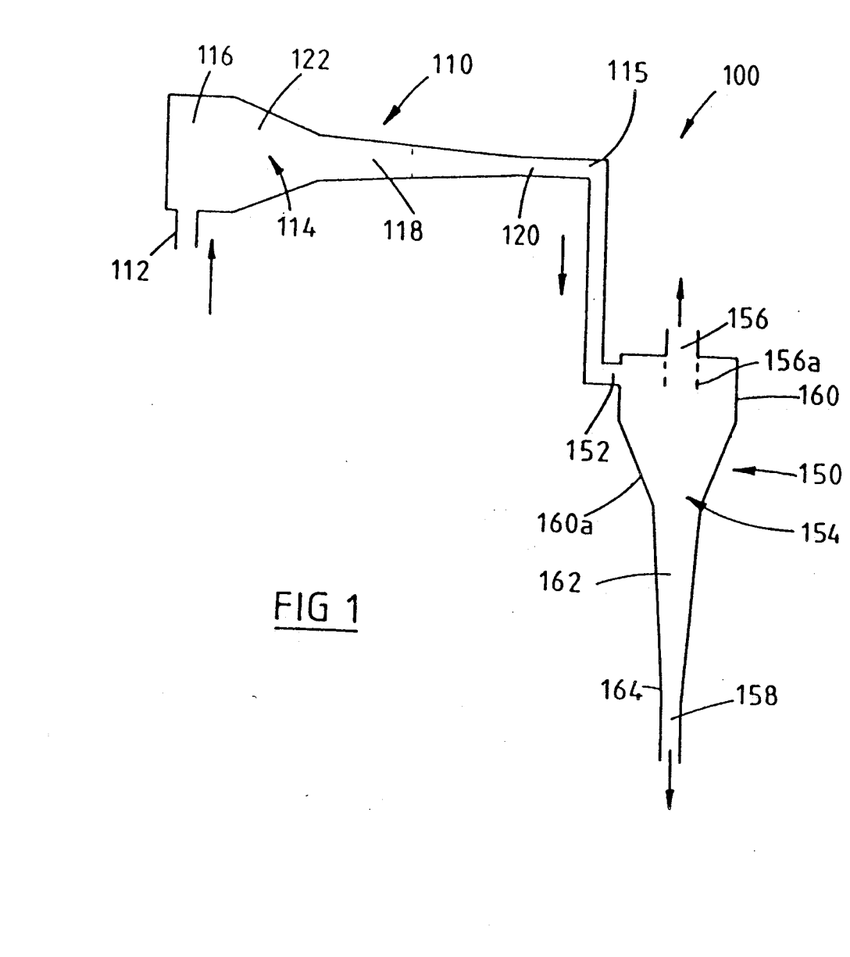
FIG. 1 is a diagram of an apparatus constructed in accordance with the invention.

Referring firstly to FIG. 1, the apparatus 100 shown therein comprises a cyclonic device 110 having an inlet 112 to an axially extending chamber 114 and an outlet 115 from the chamber 114. The chamber 114 may be formed in known fashion such as in a similar form to the separating chambers of cyclone separators described in the aforementioned prior patent specifications. In particular, the chamber 114 may be of generally tapered form, having its surface defined as an axially extending surface of revolution. More particular chamber 114 is shown as comprising three portions 116, 118, 120 arranged in that order, portion 116 being of parallel-sided cylindrical form, portion 118 being of elongate slightly tapered form and portion 120 being of parallel-sided configuration, portions 116 and 118 being preferably interconnected by a tapered flow-smoothing portion 122 as shown. Inlet 112 is arranged for inlet of liquid mixture to be separated in the apparatus 100 tangentially into the chamber 114 so as to spirally traverse lengthwise from the larger diameter end of the separating chamber, at which the inlet 112 is disposed, down the length of the chamber 114 to exit from the chamber via the outlet 115. The mixture is thus in the course of this traversal through the chamber subjected to centrifugal forces which tend to stratify the components in the mixture admitted to the chamber whereby the more dense components tend to migrate towards the periphery of the chamber in an annular disposition and the less dense components remain disposed as a central core on the axis of the chamber. There may be more than one inlet 112.

The apparatus 100 also includes a cyclone separator 150. This may be of conventional form, such as being more or less in accordance with the configuration of cyclone separators shown and described in the aforementioned prior patent specifications. In this instance, the cyclone separator is shown as having a tangential inlet 152 to a separating chamber 154. Chamber 154 has opposite axial outlets, an overflow outlet 156 at a larger diameter end of the separating chamber 154, and an underflow outlet 158 at a smaller diameter end thereof. The separating chamber may in fact be of similar form to the separating chamber 114 and is thus shown as having a first parallel-sided portion 160, a second slightly tapered portion 162 and a parallel-sided portion 164 arranged in that order, the portions 160 and 162 being interconnected by a tapered portion 160a. Of course, there may be more than one inlet 152.

The action of the separator 150 is in accordance with conventional cyclone separators, the mixture admitted into the separating chamber 154 being subjected to centrifugal action whereby the more dense components migrate to the periphery thereof and thence emerge through the underflow outlet 158 while less dense components occupy a central core within the separating chamber and are directed, by differential forces generated in the separator, from the separating chamber via the overflow outlet 156.

Figure 2:
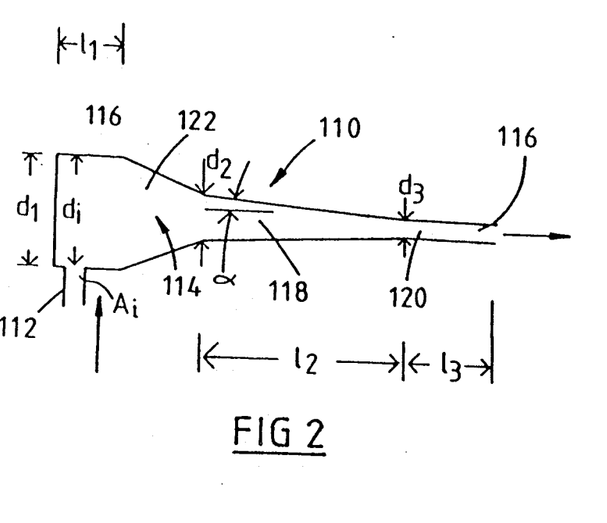
FIG. 2 is a diagram of a cyclonic device constructed in accordance with the invention.

FIG. 2 shows various dimensional parameters associated with the chamber 114 of the device 110. The chamber 114 may not be exactly as shown and generally speaking may be characterised in that at least a portion thereof has a taper such that, when viewed in axial section, tangents thereto at substantially all locations along the length thereof make a taper angle (or half angle) equal to or less than a preselected value "c" described later, such as 2° or 3° or in the range greater than 2° up to 3° to the axis of the chamber. More particularly, the chamber 114 may include a primary portion such as the portion 116 together possibly with portion 122a, having generally the form of a volume of revolution and having a first end and a second end, the diameter $d_2$ at said second end being less than the diameter $d_1$ at said first end, a generally axially symmetrical secondary portion, such as portion 118, substantially co-axial with said primary portion and positioned at said second end of said primary portion, one or more inlets 112 arranged for inflow of liquid mixture to the chamber 114 with a least a tangential component of motion relative to the axis of chamber 114, the or each inlet at said first end of said primary portion, an outlet 115 at the end of chamber 114 opposite that at which the primary portion 116 is positioned; characterized in that the following relationships apply:

where $d_1$ is the diameter of the said chamber where flow enters at the inlet portion of said chamber, (but neglecting any feed channel $d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the chamber of the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i^2}{8 A_i} \leq 30,$$

more preferably $$8 \leq \frac{\pi d_i^2}{8 A_i} \leq 16, \text{ or}$$

$$5 \leq \frac{\pi d_i^2}{8 A_i} \leq 15$$

or if $d_2$ as hereinafter described is defined, $$3 \leq \frac{\pi d_i d_2}{4 A_i} \leq 30,$$

more preferably $$8 \leq \frac{\pi d_i d_2}{4 A_i} \leq 16, \text{ or}$$

$$5 \leq \frac{\pi d_i d_2}{4 A_i} \leq 15$$

In the case where the chamber has no substantial part over which the said taper angle is equal to or less than the aforementioned small angle "c", other than a portion over which this taper angle is substantially zero, or where the taper angle is everywhere less than the angle, the parameter $d_2$ is undefined and the chamber 114 is considered as having no distinct inlet and secondary portions, the functions of the inlet and secondary portions being performed by a single portion of the chamber.

Where the chamber, possibly with an end portion adjacent said one end which has substantially zero taper, has a part over which the taper angle varies from a value greater than "c" to a value equal to or less than 'C', $d_2$ is defined as the diameter of the chamber at the lengthwise location at which the taper angle first becomes so equal to or less than "c" i.e., $d_2$ is the diameter of the chamber measured at the point $z_2$ where the condition first applies that $$\tan^{-1} \frac{d_2 - d}{2(z - z_2)} < c°$$

for all $z > z_2$, where z is the distance along the cyclonic device axis downstream of the plane at which the inlet is located (or considered to be located as next described herein if there is more than one inlet) and d is the diameter of the cyclonic device at z. Generally, where there are "x" inlets, the point $z = 0$ is the axial position of the weighted areas of the inlets such that the injection of angular momentum into the cyclonic device is equally distributed axially about said axial position where $z = 0$ and being defined by:

$$\frac{1}{A_i d_i} \sum_{x=1}^{x=n} z_x A_{ix} d_{ix} = 0$$

where $z_x$ is the axial position of the $x^{th}$ inlet.

The separating portion may be straight sided, or exhibit a variation in taper over its length, such as wherein the aforedescribed taper angle varies from a relatively greater angle at locations towards a larger diameter end of the chamber to a relatively lesser angle at locations towards said smaller diameter end.

In one construction, such tapered portion extends over substantially the whole length of the chamber. In other constructions, the chamber may be provided, adjacent said larger diameter end thereof, with the aforementioned inlet portion into which the or each said inlet extends, the inlet portion being substantially cylindrical.

In any of the above constructions, the chamber 114 may be provided with an end portion leading to said outlet, such as a portion of constant diameter leading from the secondary portion or from a portion of the separator to which inlet of liquid mixture is effected. More particularly where its secondary portion is defined, the end portion, which has length $l_3$ and outlet diameter $d_3$ is considered to begin at the axial location where the diameter of the chamber 114 at the axial location where $d/d_3 > 0.98$ for all $z_3$.

The angle "c" may, in one embodiment of the invention be selected as 2° or, in another embodiment as 3°.

Figure 3:
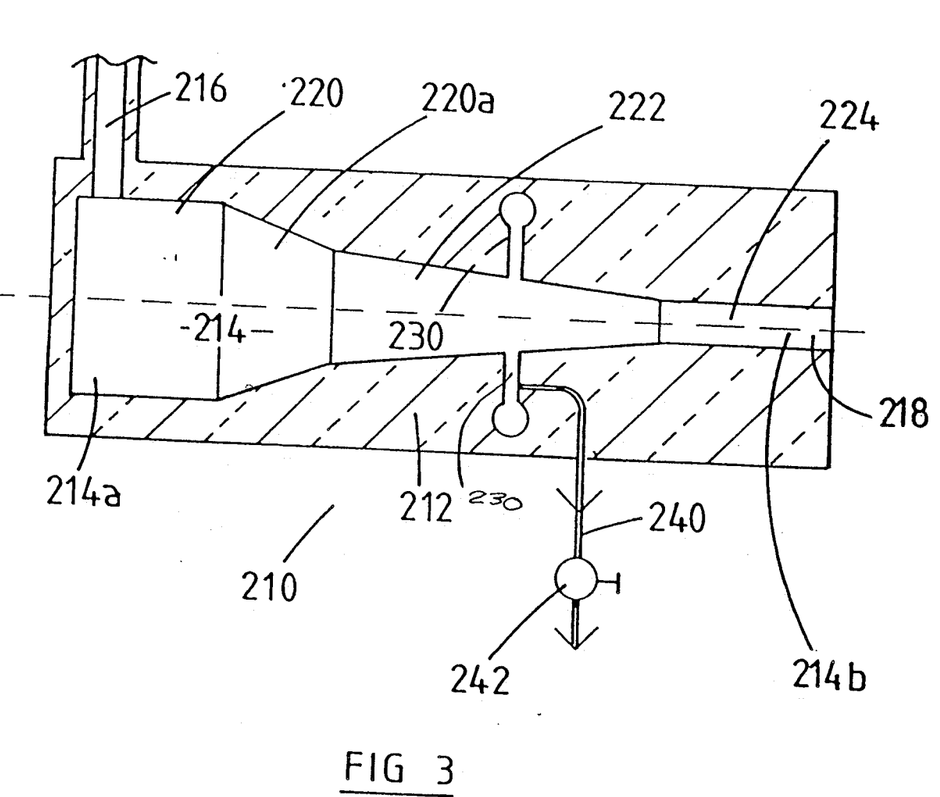
FIG. 3 is an axial cross-section of a modified form of a cyclonic device constructed in accordance with the invention.

In FIG. 3 there is shown a modified form of cyclonic device. The cyclonic device 210 shown comprises a body 212 of cylindrical form having an axially extending chamber 214 formed therewithin. The chamber 214 has the surface thereof defined as an axially extending surface of revolution and the chamber is of generally tapered form extending from a larger diameter end 214a to a smaller diameter end 214b. Adjacent end 214a there is a tangential inlet 216 whilst at the larger diameter end there is an overflow outlet 218. In this instance the end 214a is closed. The chamber 214 has a first generally cylindrical portion 220 leading via a tapered portion 220a to a second tapered portion 222 and thence to a third portion 224 which is of cylindrical form. The outlet 218 is provided from the portion 224. At the portion 222, there is provided a slot 230 formed in the surface defining the chamber 214 this extending, in this case, substantially entirely around the circumference thereof and in a plane normal to the axis of the device. An outlet duct 240 is provided communicating with the slot 230.

In use of the device 210 a liquid mixture is passed in through the inlet 216 with a tangential component of motion and spirals lengthwise of the chamber 214 to exit from the outlet 218. As described, it has been found that this action substantially aids subsequent separation of components in the liquid mixture so passed through the device. It has also been found that the slot 230 tends to attract thereinto heavier particles or components within the liquid mixture and these may be taken off through the slot 230 via duct 240. If desired, the duct may have a valve 242 therein to control the flow out of the slot 230 and duct 240.

Generally, in the case where the mixture passed through the device 210 is in the form of an oil water mixture, heavier components, such as sand, grit or the like will, possibly together with some of the other heavier components such as water in the mixture, pass out through the slot 230 and duct 240. Thus, in addition to preconditioning the mixture for separating later, certain unwanted components may readily be removed by the action of the device 210.

If desired, the device 210 may include an axial overflow outlet at the larger diameter end to remove some of the lighter components in the mixture passed into the device.

Figure 4:
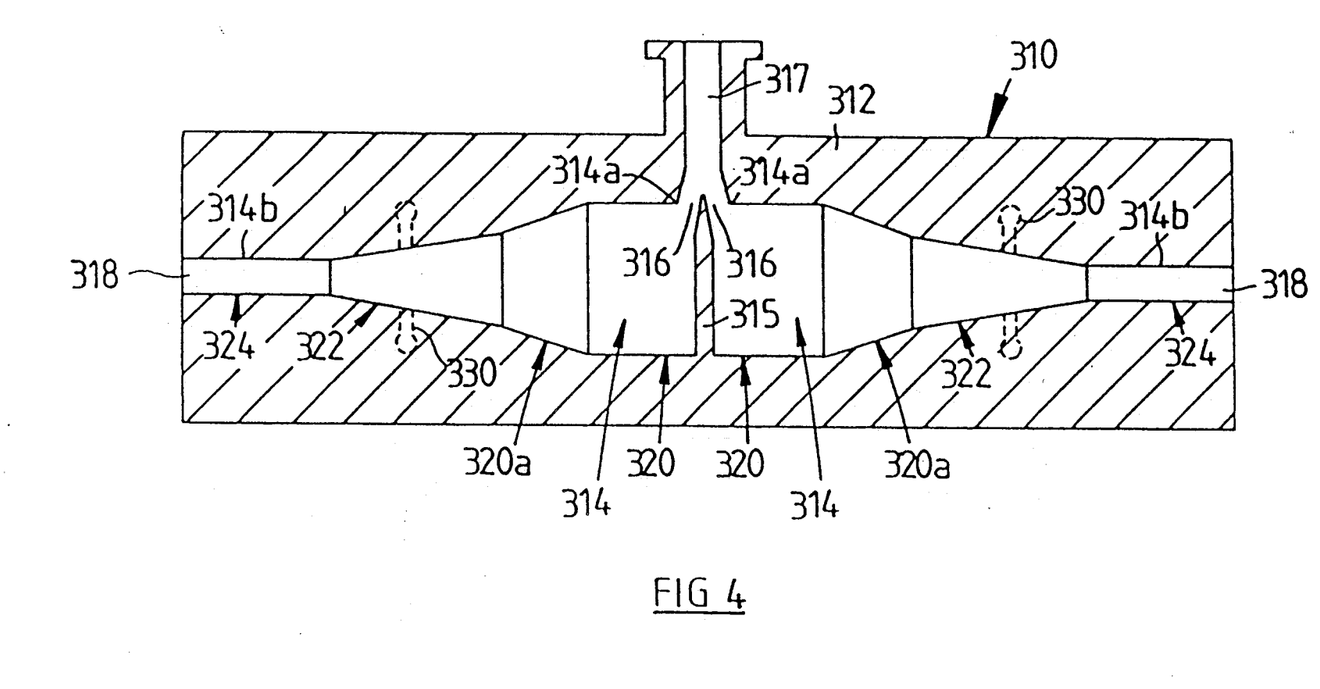
FIGS. 4 and 5 are respective cross-sectional diagrams of two further cyclonic devices constructed in accordance with the invention.
Figure 5:
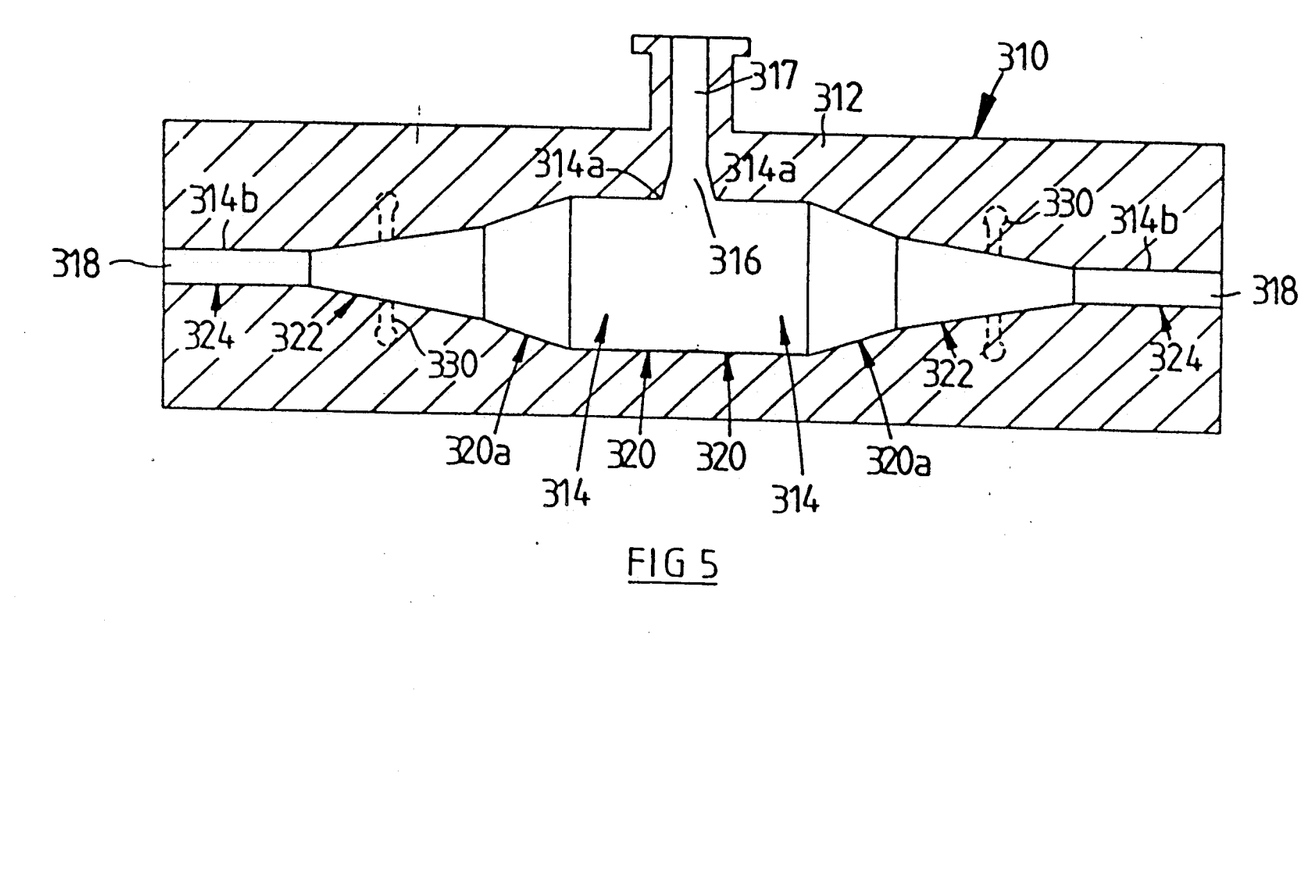

FIGS. 4 and 5 show modified arrangements for the cyclonic device where this has two chambers. More particularly, the cyclonic device shown in FIG. 4 comprises a body 312 of generally cylindrical form having two coaxially arranged elongate chambers 314 formed therein and separated by a transverse wall 315. Each chamber 314 has its surface thereof defined as an axially extending surface of revolution, the chambers being generally tapered in form, extending from larger diameter end 314a to smaller diameter ends 314b, the larger diameter ends 314a being adjacent each other and wall 315, the ends 314b being arranged at the opposite ends of the body 312. Adjacent ends 314a, there is a common tangential inlet pipe 317 which leads to tangential inlets 316 to the respective chambers 314. The ends 314a of the chambers are closed by the wall 315.

Each chamber 314 has a generally cylindrical portion 320 at the larger diameter, end 314a, and to which the inlets 316 provide access, the portions 320 leading via tapered portions 320a to a second, tapered, portion 322 of each chamber and thence to a third portion 324 of each chamber, the portions 324 being of cylindrical form. The outlets 318 are provided from the portions 324 as axial outlets.

In use of the device 310, a liquid mixture is passed in through the inlet pipe 317 and is directed via the inlets 316 with a tangential component of motion into the chambers 314 whereby to spiral lengthwise of the chambers 314 to exit from the outlets 318.

In another embodiment, shown in FIG. 5, the chambers are similar to those shown in FIG. 4 and like reference numerals denote common parts in FIGS. 4 and 5. In this case, however, the wall 315 is omitted. In each of the embodiments of FIGS. 4 and 5 the chambers 314 may be provided with slots 330 for off-take of heavier materials in the same fashion as with the slot 230 in the embodiment of FIG. 2. Of course, the chambers 314 of device 310 may each precondition a mixture prior to outlet therefrom to the inlets of two separate separators 150.

In general, the or each cyclone separator 150 may have a separating chamber having an inlet portion, such as portion 160, or portion 160 and portion 160a, a second or separating portion, such as portion 162, and possibly also an end portion such as portion 164. A vortex finder or inwardly directed duct extending from and forming part of the overflow inlet may be provided, such as indicated by broken lines at 156a in FIG. 1.

The actual geometry employed for separator 150 may be selected to render the separator suitable for particular purposes. Such variation is desirable in accordance with whether the separator is intended for 'de-oiling' applications, where separation of small concentrations of oil from large concentrations of water is required, or for 'dewatering' applications where separation of larger quantities of oil from water is required. Dewatering generally, but not necessarily, involves that the less dense phase (for example oil), constitutes the disperse phase in the inlet mixture, whilst deoiling generally involves that the more dense phase (for example water) constitutes the disperse phase in the inlet mixture.

More particularly, the separator may comprise:
(a) an inlet portion having generally the form of a volume of revolution, and one or more inlet channels,
(b) an overflow outlet coaxial with the inlet portion,
(c) a generally axially symmetrical converging separation portion adjacent to the inlet portion and on the opposite side from the overflow outlet, and, optionally,
(d) a downstream portion into which the separation portion converges, and, optionally,
(e) a vortex finder in the form of an axial tube projecting through the end wall of the separating chamber at the inlet end into the inlet portion and in this case defining at its inner end the overflow outlet;

the following relationships (i)-(v) applying wherein $d_o$ is the minimum internal diameter of the overflow outlet at the separator end wall if no vortex finder is provided, or where provided, within $3d_2$ of the inlet plane or at the vortex finder end if this is not within $3d_2$ of the inlet plane, $d_1$ is the diameter of the cyclone in the inlet portion where the feed enters, neglecting any inlet channel, $d_2$ is the diameter of the cyclone where the inlet portion joins the separation portion, the junction being as hereinafter defined, $d_3$ is the diameter of the cyclone where the separation portion ends or joins the downstream portion, the junction being as hereinafter defined, $d_{ix}$ is twice the radius at which flow enters the cyclone through the $x^{th}$ inlet, (i.e., twice the minimum distance of the tangential component of the inlet centre line from the axis), $A_{ix}$ is the cross-sectional area of the $x^{th}$ inlet, as hereinafter defined, $$A_i = \sum_{x=1}^{n} A_{ix}$$

$$d_i = \frac{1}{A_i} \sum_{x=1}^{n} d_{ix}A_{ix}, \text{ and}$$

$\alpha$ is the half angle of convergence of the separation portion as hereinafter defined:

$$3 \leq \frac{\pi d_2 d_i}{4A_i} \leq 30, \text{ such as} \qquad \text{(i)}$$

$$8 \leq \frac{\pi d_2 d_i}{4A_i} \leq 16$$

(ii) for "dewatering" geometries:
$1° \leq \alpha < 3°$, suitably $1\frac{1}{2}° \leq \alpha < 3°$, conveniently $2° \leq \alpha < 3°$;
or for deoiling geometries:
$20' \leq \alpha \leq 2°$, such as $52' \leq \alpha \leq 1°$.
(iii) for "dewatering" geometries:

$$0.25 < \frac{d_o}{d_2} < 0.65;$$

or, for deoiling geometries:

$$\frac{d_o}{d_2} < 0.2$$

$0.9 \, d_1 > d_2$                                                     (iv)
$0.9 \, d_2 > d_3$                                                     (v)

The inlet plane is defined as the plane perpendicular to the axis of the cyclone at the mean axial position of the weighted areas of the inlets such that the injection of angular momentum into the hydrocyclone is equally distributed axially about it and is thus such that $$\frac{1}{A_i d_i} \sum_{x=1}^{n} Z_x A_{ix} d_{ix} = 0,$$

wherein $Z_x$ is the axial position of the centre line of the $x^{th}$ inlet.

The junction of the inlet portion and the separation portion is defined as being at the axial position $z_2$ (measured away from the inlet plane where $z=0$) where the condition first applies that:

$$\tan^{-1} \frac{d_2 - d}{2(z - z_2)} < 3°,$$

for a dewatering cyclone, or $$\tan^{-1} \frac{d_2 - d}{2(z - z_2)} < 2°,$$

for a deoiling cyclone, for all $z > z_2$, where $d$ is the cyclone diameter at $z$.

The junction of the separation portion and the downstream outlet portion, if present, is defined as the diameter at $z_3$ where $d/d_3 > 0.98$ for all $z > z_3$. $\alpha$ is defined as $$\tan^{-1} \frac{d_2 - d_3}{2(z_3 - z_2)}$$

$A_{ix}$ is the minimum cross section of the $x^{th}$ inlet at entry to the cyclone in a plane parallel to the axis of the cyclone.

Where the overflow outlet is provided in a vortex finder, the so provided vortex finder outlet preferably terminates within $3d_2$ of the inlet plane, this distance being defined as $l_o$.

Preferably the axial overflow outlet, i.e., the vortex finder outlet, projects into the cyclone at least as far as the inlet plane.

The expression $$\frac{\pi \, d_2 d_i}{4A_i},$$

termed the "swirl coefficient" and designated S, is a reasonable predictor of the ratio of velocities tangentially: axially of flow which has entered the cyclone and which has reached the plane of $d_2$.

The or each inlet channel is preferably fed from a duct directed substantially tangentially into the inlet portion. Each inlet channel may spiral inwardly in a volute entry. The outer surface of the channel may converge to the diameter of the inlet portion $d_1$ after $360°/n$ around the axis, wherein n is the number of feed channels.

The inlet channel(s) need not be in a plane normal to the axis and may be offset in a generally helical form. They may attain the diameter $d_1$ after more than $360°/n$ around the axis. If the inlet portion is itself conical, then the diameter will be approximately $d_1$.

The convergence averaged from the diameter $d_1$ measured in the inlet plane to the diameter $d_2$ may have the greatest cone half-angle $\theta$ in the cyclone, which may be in the range 5° to 45°.

The dimensions of the inlet portion should be such that the angular momentum of feed entering from the inlets is substantially conserved into the separation portion.

It is possible for at least part of the generator of the inlet portion or of the separation portion or of both to be curved. The generator may be, for example, (i) a monotonic curve (having no points of inflexion) steepest at the inlet-portion end and tending to a cone-angle of zero at its open end, or (ii) a curve with one or more points of inflexion but overall converging towards the downstream outlet portion, preferably never diverging towards the downstream outlet portion.

The apparatus 100 is particularly effective in separating oil-water mixtures. The device 110 is thought to improve efficiency of the separator 150 by consolidating droplets of the dispersed phase of the mixture into droplets of increased size. These increased size droplets may more easily be separated from the continuous phase by conventional separating techniques such as subjecting the mixture to centrifugal action. The separator 150 may be replaced by other forms of separator, such as settling chambers or the like, including floatation devices.

In the above, the term $A_{ix}$ is defined differently for the device 110, as compared with the definition given in relation to the separator 150. Generally speaking, these two definitions result in practically indistinguishable values for $A_{ix}$ in most situations and the definition wherever given in one form may be replaced by the other definition given, as desired.

Figure 6:
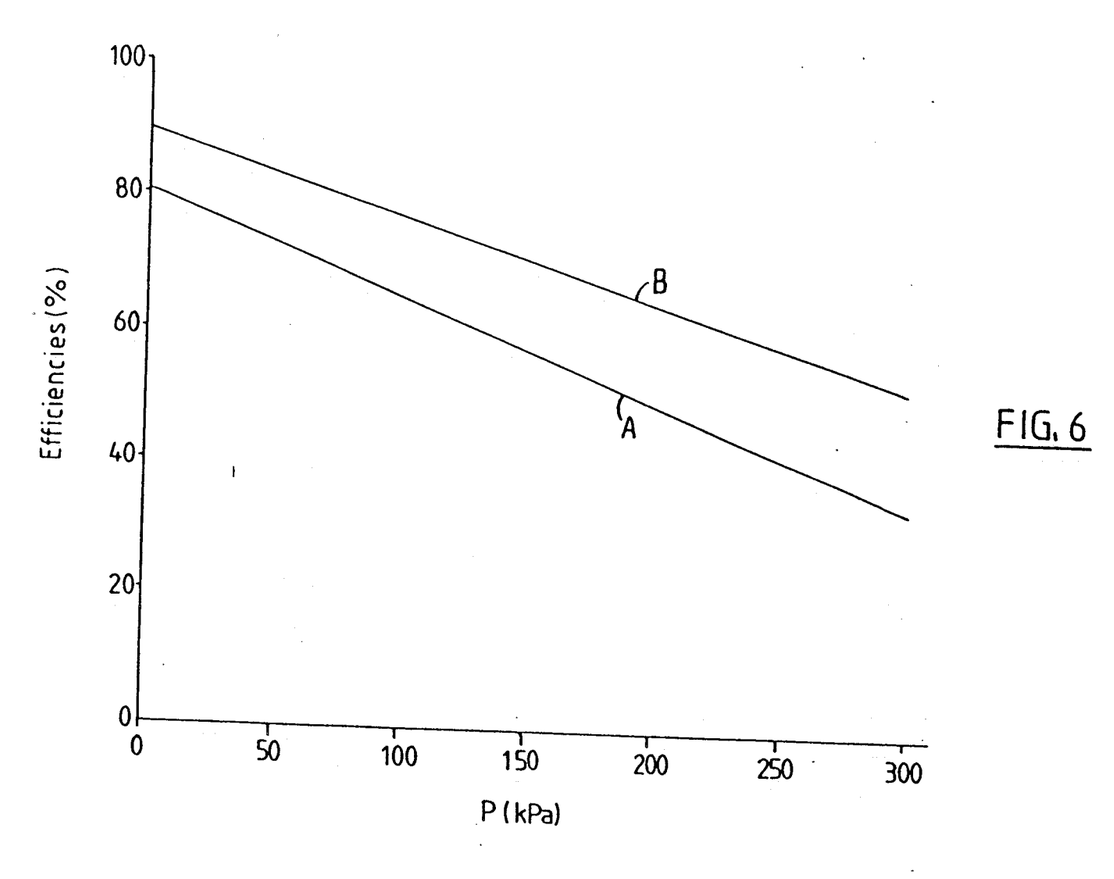
FIG. 6 is a graph illustrating separating efficiency of an apparatus constructed in accordance with the invention.

In FIG. 6, results are plotted (plot "A") for separating efficiency of a cyclone separator 150 over a range of pressure drops through the separator when the separator is used alone for separating oil from mixtures of water with oil.

Plot "B" depicts the separating efficiency of the same separator, where the inlet mixture is first passed through a cyclonic device 110.

The oil-water mixture comprised a mixture of water and diesel oil, the latter being present in concentrations of the order of 500 ppm.

Parameters relating to the separator for which the results depicted in FIG. 6 were obtained were approximately as follows:

$l_1 = 70$ mm
$d_1 = 70$ mm
$d_2 = 35$ mm
$l_2 = 670$ mm
$l_3 = 700$ mm
½ angle of taper of portion $162 = 0.75°$
$d_0 = 2$ mm $$d_i d_2 / 4 A_i = 9$$

half angle of taper of portion $160a = 10°$

The apparatus was operated at flow rates of the order of 20–80 liters per minute.

The device 110 was substantially of the same form as the separator 150, save that the overflow outlet was blocked off and the parameter $d_i d_2/4A_i$ had a value of approximately 21. As shown, an overall efficiency increase of up to 18% was observed, when the device 110 was used to precondition mixtures fed to separator 150.

Usually, where the separator 150 is a deoiling separator, the geometry of the device 110 may be correspondingly chosen, i.e., by selecting the aforementioned angle "c" to be 2°. Similarly, where separator 150 is a dewatering separator, the geometry of the device 110 may again be correspondingly chosen, i.e., the angle "c" being selected to be equal to 3°. However, it is possible to employ geometries for device 110 where "c" is equal to 3° in conjunction with a deoiling separator 150, or to employ a geometry for device 110 where "c" is equal to 2° in conjunction with a dewatering separator 150.

We claim:

1. A method of separating components of a liquid mixture comprising passing the mixture to a cyclonic device from which the components of the mixture are taken via one outlet and then together passed to a separating device from which the separated components are separately taken.

2. A method as claimed in claim 1 wherein said cyclonic device has a chamber having one or more inlets for inlet of said mixture to the chamber with a tangential component of motion, and to which chamber said outlet communicates in the form of an elongate surface of revolution and wherein the following relationships apply:

$d_{ix}$ is twice the radius at which flow enters the cyclonic device through the $x^{th}$ inlet and $$d_i = \frac{1}{A_i} \sum_{x=1}^{x=n} d_{ix} A_{ix}$$

where $A_{ix}$ is the projection of the cross sectional area of $x^{th}$ inlet measured at entry to the chamber of the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i^2}{8 A_i} \leq 30$$

3. A method as claimed in claim 1 wherein said cyclonic device has a chamber having one or more inlets for inlet of said mixture to the chamber with a tangential component of motion, and to which chamber said outlet communicates in the form of an elongate surface of revolution and wherein the following relationships apply:

where $d_1$ is the diameter of the said chamber where flow enters, preferably in an inlet portion at said one end of said chamber, (but neglecting any feed channel) $d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i d_2}{4 A_i} \leq 30$$

said chamber having a part over which the taper angle varies from a value greater than 3° to a value equal to or less than 3°;

$d_2$ is the diameter of the chamber at the lengthwise location $z_2$ where the condition first applies that $$\tan^{-1}\frac{d_2 - d}{2(z - z_2)} < 3°$$

for all $z > z_2$, where d is the diameter chamber at location z, where z is the distance along the cyclonic device axis downstream of the plane, located at point $z_o$, where $z = 0$ being the axial position of the inlet or of the weighted areas of the inlets such that the injection of angular momentum into the cyclonic device is equally distributed axially about said axial position where $z = 0$ and being defined by:

$$\frac{1}{A_i d_i} \sum_{x=1}^{x=n} z_x A_{ix} d_{ix} = 0$$

where $z_x$ is the axial position of the $x^{th}$ inlet.

4. A method as claimed in claim 1 wherein said cyclonic device has a chamber having one or more inlets for inlet of said mixture to the chamber with a tangential component of motion, and to which chamber said outlet communicates in the form of an elongate surface of revolution and wherein the following relationships apply:
where $d_1$ is the diameter of the said chamber where flow enters, preferably in an inlet portion at said one end of said chamber, (but neglecting any feed channel $d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i d_2}{4 A_i} \leq 30$$

said chamber having a part over which the taper angle varies from a value greater than 2° to a value equal to or less than 2°,
$d_2$ is the diameter of the chamber at the lengthwise location $z_2$ where the condition first applies that $$\tan^{-1}\frac{d_2 - d}{2(z - z_2)} < 2°$$

for all $z > z_2$, where d is the diameter of the chamber at location z, where z is the distance along the cyclonic device axis downstream of the plane, located at point $z_o$, where $z = 0$ being the axial position of the inlet or of the weighted areas of the inlets such that the injection of angular momentum into the cyclonic device is equally distributed axially about said axial position where $z = 0$ and being defined by:

$$\frac{1}{A_i d_i} \sum_{x=1}^{x=n} z_x A_{ix} d_{ix} = 0$$

where $z_x$ is the axial position of the $x^{th}$ inlet.

5. A method as claimed in any preceding claim wherein said separator comprises:
 (a) an inlet portion having generally the form of a volume of revolution, and one or more inlet channels,
 (b) an overflow outlet coaxial with the inlet portion,
 (c) a generally axially symmetrical converging separation portion adjacent to the inlet portion and on the opposite side from the vortex finder outlet, the following relationships (i)-(v) applying wherein $d_o$ is the minimum internal diameter of the overflow outlet
 $d_1$ is the diameter of the cyclone in the inlet portion where the feed enters, neglecting any inlet channel,
 $d_2$ is the diameter of the cyclone where the inlet portion joins the separation portion, the junction being as hereinafter defined,
 $d_3$ is the diameter of the cyclone where the separation portion ends or joins the downstream portion, the junction being as hereinafter defined,
 $d_{ix}$ is twice the radius at which flow enters the cyclone through the $x^{th}$ inlet, (i.e., twice the minimum distance of the tangential component of the inlet centre line from the axis),
 $A_{ix}$ is the cross-sectional area of the $x^{th}$ inlet, as hereinafter defined, $$A_i = \sum_{x=1}^{n} A_{ix}$$

$$d_i = \frac{1}{A_i} \sum_{x=1}^{n} d_{ix} A_{ix}, \text{ and}$$

$\alpha$ is the half angle of convergence of the separation portion as hereinafter defined:

$$3 \leq \frac{\pi d_2 d_i}{4 A_i} \leq 30, \tag{i}$$

$$20' \leq \alpha \leq 2°, \text{ such as } 52' \leq \alpha \leq 1°, \tag{ii}$$

$$\frac{d_o}{d_2} < 0.2 \tag{iii}$$

$$0.9 \, d_1 > d_2 \tag{iv}$$
$$0.9 \, d_2 > d_3, \tag{v}$$

the inlet plane being the plane perpendicular to the axis of the cyclone at the mean axial position of the weighted areas of the or each inlet such that the injection of angular momentum into the hydrocyclone is equally distributed axially about it, such that:

$$\frac{1}{A_i d_i} \sum_{x=1}^{n} Z_x A_{ix} d_{ix} = 0,$$

wherein $Z_x$ is the axial position of the centre line of the $x^{th}$ inlet, the junction of the inlet portion and the separation portion being at the axial position $z_2$ (measured away from the inlet plane where $z=0$) where the condition first applies that:

$$\tan^{-1} \frac{d_2 - d}{2(z - z_2)} < 2°,$$

for all $z > z_2$, where d is the cyclone diameter at z, and $A_{ix}$ is the minimum cross section of the $x^{th}$ inlet at entry to the cyclone in a plane parallel to the axis of the cyclone.

6. A method as claimed in claim 1 wherein said separator comprises:
   (a) an inlet portion having generally the form of a volume of revolution, and one or more inlet channels,
   (b) an overflow outlet coaxial with the inlet portion,
   (c) a generally axially symmetrical converging separation portion adjacent to the inlet portion and on the opposite side from the vortex finder outlet, the following relationships (i)-(v) applying wherein $d_o$ is the minimum internal diameter of the overflow outlet at the separator end wall if no vortex finder is provided, or where provided, within $3d_2$ of the inlet plane or at the vortex finder end if this is not within $3d_2$ of the inlet plane,
   $d_1$ is the diameter of the cyclone in the inlet portion where the feed enters, neglecting any inlet channel,
   $d_2$ is the diameter of the cyclone where the inlet portion joins the separation portion, the junction being as hereinafter defined,
   $d_3$ is the diameter of the cyclone where the separation portion ends the junction being as hereinafter defined,
   $d_{ix}$ is twice the radius at which flow enters the cyclone through the $x^{th}$ inlet, (i.e., twice the minimum distance of the tangential component of the inlet centre line from the axis),
   $A_{ix}$ is the cross-sectional area of the $x^{th}$ inlet, as hereinafter defined, $$A_i = \sum_{x=1}^{n} A_{ix}$$

$$d_i = \frac{1}{A_i} \sum_{x=1}^{n} d_{ix} A_{ix}, \text{ and}$$

$\alpha$ is the half angle of convergence of the separation portion as hereinafter defined:

$$3 \leq \frac{\pi d_2 d_i}{4 A_i} \leq 30, \quad \text{(i)}$$

(ii) $1° \leq \alpha < 3°$, suitably $1\frac{1}{2}° \leq \alpha < 3°$, conveniently $2° \leq \alpha < 3°$;

$$0.25 < \frac{d_o}{d_2} < 0.65; \quad \text{(iii)}$$

(iv) $0.9 \, d_1 > d_2$
(v) $0.9 \, d_2 > d_3$,
the inlet plane being the plane perpendicular to the axis of the cyclone at the mean axial position of the weighted areas of the or each inlet such that the injection of angular momentum into the hydrocyclone is equally distributed axially about it, such that:

$$\frac{1}{A_i d_i} \sum_{x=1}^{n} Z_x A_{ix} d_{ix} = 0,$$

wherein $Z_x$ is the axial position of the centre line of the $x^{th}$ inlet, the junction of the inlet portion and the separation portion being at the axial position $z_2$ (measured away from the inlet plane where $z=0$) where the condition first applies that:

$$\tan^{-1} \frac{d_2 - d}{2(z - z_2)} < 3°,$$

for all $z > z_2$, where d is the cyclone diameter at z, and $A_{ix}$ is the minimum cross section of the $x^{th}$ inlet at entry to the cyclone in a plane parallel to the axis of the cyclone.

7. Apparatus for separating components of a liquid mixture and comprising a cyclonic device and a separating device, the cyclonic device having an inlet for inlet of the mixture, a chamber in which, in use, the admitted mixture is subjected to centrifugal action and an outlet from which the components of the mixture are in use together taken, the separating device having a separating chamber with an inlet coupled to in use receive the components from the outlet of the cyclonic device for admission to the separating chamber, and separate outlets from the separating chamber for respective outlet therefrom of the separated liquid components.

8. Apparatus as claimed in claim 1 wherein said cyclonic device has a chamber having one or more inlets for inlet of said mixture to the chamber with a tangential component of motion, and to which chamber said outlet communicates in the form of an elongate surface of revolution and wherein the following relationships apply:
   $d_{ix}$ is twice the radius at which flow enters the cyclone through the $x^{th}$ inlet and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i^2}{8 A_i} \leq 30$$

9. Apparatus as claimed in claim 7 wherein said cyclonic device has a chamber having one or more inlets for inlet of said mixture to the chamber with a tangential component of motion, and to which chamber said outlet communicates in the form of an elongate surface of revolution and wherein the following relationships apply:

where $d_1$ is the diameter of the said chamber where flow enters, preferably in an inlet portion at said one end of said chamber, (but neglecting any feed channel) $d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i d_2}{4 A_i} \leq 30$$

said chamber having a part over which the taper angle varies from a value greater than 3° to a value equal to or less than 3°, $d_2$ is the diameter of the chamber at the lengthwise location $z_2$ where the condition first applies that $$\tan^{-1} \frac{d_2 - d}{2(z - z_2)} < 3°$$

for all $z > z_2$, where d is the diameter of the chamber at location z, where z is the distance along the cyclonic device axis downstream of the plane, located at point $z_o$ where $z=0$ being the axial position of the inlet or of the weighted areas of the inlets such that the injection of angular momentum into the cyclonic device is equally distributed axially about said axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

10. Apparatus as claimed in claim 7 wherein said cyclonic device has a chamber having one or more inlets for inlet of said mixture to the chamber with a tangential component of motion, and to which chamber said outlet communicates in the form of an elongate surface of revolution and wherein the following relationships apply:

where $d_1$ is the diameter of the said chamber where flow enters, preferably in an inlet portion at said one end of said chamber, (but neglecting any feed channel) $d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $$3 \leq \frac{\pi d_i d_2}{4 A_i} \leq 30$$

said chamber having a part over which the taper angle varies from a value greater than 2° to a value equal to or less than 2°, $d_2$ is the diameter of the chamber at the lengthwise location $z_2$ where the condition first applies that $$\tan^{-1} \frac{d_2 - d}{2(z - z_2)} < 2°$$

for all $z > z_2$, where d is the diameter of the chamber at location z, where z is the distance along the cyclonic device axis downstream of the plane, located at point $z_o$ where $z=0$ being the axial position of the inlet or of the weighted areas of the inlets such that the injection of angular momentum into the cyclonic device is equally distributed axially about said axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

11. Apparatus as claimed in any one of claims 7 to 10 wherein said separator comprises:
   (a) an inlet portion having generally the form of a volume of revolution, and one or more inlet channels,
   (b) an overflow outlet coaxial with the inlet portion,
   (c) a generally axially symmetrical converging separation portion adjacent to the inlet portion and on the opposite side from the vortex finder outlet, the following relationships (i)-(v) applying wherein $d_o$ is the minimum internal diameter of the overflow outlet
   $d_1$ is the diameter of the cyclone in the inlet portion where the feed enters, neglecting any inlet channel,
   $d_2$ is the diameter of the cyclone where the inlet portion joins the separation portion, the junction being as hereinafter defined,
   $d_3$ is the diameter of the cyclone where the separation portion ends or joins the downstream portion, the junction being as hereinafter defined, $d_{ix}$ is twice the radius at which flow enters the cyclone through the $x^{th}$ inlet, (i.e., twice the minimum distance of the tangential component of the inlet centre line from the axis), $A_{ix}$ is the cross-sectional area of the $x^{th}$ inlet, as hereinafter defined, $$A_i = \sum_{x=1}^{n} A_{ix}$$

$$d_i = \frac{1}{A_i} \sum_{x=1}^{n} d_{ix}A_{ix}, \text{ and}$$

$\alpha$ is the half angle of convergence of the separation portion as hereinafter defined:

$$3 \leq \frac{\pi d_2 d_i}{4A_i} \leq 30, \quad \text{(i)}$$

(ii) $20' \leq \alpha \leq 2°$, such as $52' \leq \alpha \leq 1°$, $$\frac{d_0}{d_2} < 0.2 \quad \text{(iii)}$$

(iv) $0.9\, d_1 > d_2$
(v) $0.9\, d_2 > d_3$, the inlet plane being the plane perpendicular to the axis of the cyclone at the mean axial position of the weighted areas of the or each inlet such that the injection of angular momentum into the hydrocyclone is equally distributed axially about it, such that:

$$\frac{1}{A_i d_i} \sum_{x=1}^{n} Z_x A_{ix} d_{ix} = 0,$$

wherein $Z_x$ is the axial position of the centre line of the $x^{th}$ inlet, the junction of the inlet portion and the separation portion being at the axial position $z_2$ (measured away from the inlet plane where $z=0$) where the condition first applies that:

$$\tan^{-1} \frac{d_2 - d}{2(z - z_2)} < 2°,$$

for all $z > z_2$, where $d$ is the cyclone diameter at $z$, and $A_{ix}$ is the minimum cross section of the $x^{th}$ inlet at entry to the cyclone in a plane parallel to the axis of the cyclone.

12. Apparatus as claimed in claim 7 wherein said separator comprises:
 (a) an inlet portion having generally the form of a volume of revolution, and one or more inlet channels,
 (b) an overflow outlet coaxial with the inlet portion,
 (c) a generally axially symmetrical converging separation portion adjacent to the inlet portion and on the opposite side from the vortex finder outlet, the following relationships (i)-(v) applying wherein $d_o$ is the minimum internal diameter of the overflow outlet at the separator end wall if no vortex finder is provided, or where provided, within $3d_2$ of the inlet plane or at the vortex finder end if this is not within $3d_2$ of the inlet plane, $d_1$ is the diameter of the cyclone in the inlet portion where the feed enters, neglecting any inlet channel, $d_2$ is the diameter of the cyclone where the inlet portion joins the separation portion, the junction being as hereinafter defined, $d_3$ is the diameter of the cyclone where the separation portion ends the junction being as hereinafter defined, $d_{ix}$ is twice the radius at which flow enters the cyclone through the $x^{th}$ inlet, (i.e., twice the minimum distance of the tangential component of the inlet centre line from the axis), $A_{ix}$ is the cross-sectional area of the $x^{th}$ inlet, as hereinafter defined, $$A_i = \sum_{x=1}^{n} A_{ix}$$

$$d_i = \frac{1}{A_i} \sum_{x=1}^{n} d_{ix}A_{ix}, \text{ and}$$

$\alpha$ is the half angle of convergence of the separation portion as hereinafter defined:

$$3 \leq \frac{\pi d_2 d_i}{4A_i} \leq 30, \quad \text{(i)}$$

(ii) $1° \leq \alpha < 3°$, suitably $1\frac{1}{2}° \leq \alpha < 3°$, conveniently $2° \leq \alpha < 3°$;

$$0.25 < \frac{d_0}{d_2} < 0.65; \quad \text{(iii)}$$

(iv) $0.9\, d_1 > d_2$
(v) $0.9\, d_2 > d_3$, the inlet plane being the plane perpendicular to the axis of the cyclone at the mean axial position of the weighted areas of the or each inlet such that the injection of angular momentum into the hydrocyclone is equally distributed axially about it, such that:

$$\frac{1}{A_i d_i} \sum_{x=1}^{n} Z_x A_{ix} d_{ix} = 0,$$

wherein $Z_x$ is the axial position of the centre line of the $x^{th}$ inlet, the junction of the inlet portion and the separation portion being at the axial position $z_2$ (measured away from the inlet plane where $z=0$) where the condition first applies that:

$$\tan^{-1} \frac{d_2 - d}{2(z - z_2)} < 3°,$$

for all $z > z_2$, where $d$ is the cyclone diameter at $z$, and $A_{ix}$ is the minimum cross section of the $x^{th}$ inlet at entry to the cyclone in a plane parallel to the axis of the cyclone.

13. Apparatus for preconditioning a mixture prior to separating components of the mixture one from the other comprising a cyclonic device having a generally tapered chamber with an inlet arranged for inlet of the mixture to the chamber with a tangential component of motion, the inlet being adjacent the larger diameter end, the chamber having at least an outlet at the smaller diameter end, the chamber having, in the wall thereof, a slot disposed downstream of the inlet and communicating exteriorly of the device for removal of a component from the liquid mixture to be treated.

14. Apparatus as claimed in claim 13 wherein said slot-extends around the circumference of the internal surface of the chamber.

15. Apparatus as claimed in claim 13 wherein said slot extends around part of the internal surface of the chamber.

16. Apparatus as claimed in any one of claims 13, 14 or 15 wherein more than one said slot is provided, the slots being separated in the lengthwise direction of the chamber and/or circumferentially thereof.

17. Apparatus as claimed in claim 7 wherein said chamber is one of two chambers arranged adjacent to each other and arranged for admission of liquid mixture to the chambers via the or each said inlet open to adjacent ends of the chambers and each chamber having a respective said outlet at an end of the respective chamber remote from the end at which the or each inlet is disposed.

18. An axially extending cyclonic device having an elongate chamber having at least one inlet at one closed end thereof and an axial outlet at the other end, the or each inlet being arranged for inflow of a liquid mixture into the chamber with a tangential component of motion whereby to cause the mixture to be subjected to centrifugal action and thence to be directed to emerge from the chamber via said outlet, and wherein $$3 \leq \frac{\pi d_i^2}{8 A_i} \leq 30$$

where $$d_i = \frac{1}{A_i} \sum_{x=1}^{x=n} d_{ix} A_{ix}$$

where $A_{ix}$ is the projection of the cross sectional area of $x^{th}$ inlet measured at entry to the chamber of the cyclonic device in a plane parallel to the axis of the cyclonic device which is normal to the plane, also parallel to the cyclonic device axis, which contains the tangential component of the inlet centre line that is tangential to the circle of diameter $d_{ix}$ and where:

$$A_i = \sum_{x=1}^{x=n} A_{ix}$$

and $d_{ix}$ is twice the radius at which flow enters the cyclonic device through the $x^{th}$ inlet.

* * * * *